United States Patent
Simcik et al.

(10) Patent No.: US 10,259,681 B2
(45) Date of Patent: Apr. 16, 2019

(54) ELEVATOR DISPATCH USING FINGERPRINT RECOGNITION

(71) Applicant: Otis Elevator Company, Farmington, CT (US)

(72) Inventors: Paul A. Simcik, Southington, CT (US); Bradley Armand Scoville, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 403 days.

(21) Appl. No.: 15/031,354

(22) PCT Filed: Oct. 24, 2013

(86) PCT No.: PCT/US2013/066582
§ 371 (c)(1),
(2) Date: Apr. 22, 2016

(87) PCT Pub. No.: WO2015/060851
PCT Pub. Date: Apr. 30, 2015

(65) Prior Publication Data
US 2016/0264378 A1    Sep. 15, 2016

(51) Int. Cl.
*B66B 1/34* (2006.01)
*B66B 1/46* (2006.01)
*B66B 1/28* (2006.01)

(52) U.S. Cl.
CPC ............... *B66B 1/468* (2013.01); *B66B 1/28* (2013.01); *B66B 2201/222* (2013.01);
(Continued)

(58) Field of Classification Search
CPC ... B66B 1/468; B66B 1/28; B66B 2201/4615; B66B 2201/463; B66B 2201/4676; B66B 2201/222; B66B 2201/4638
(Continued)

(56) References Cited

U.S. PATENT DOCUMENTS 5,949,037 A * 9/1999 Oya .................. B66B 1/462
187/381
6,382,363 B1 * 5/2002 Friedli .................. B66B 1/468
187/384
(Continued)

FOREIGN PATENT DOCUMENTS

CN    102381596 A    3/2012
CN    102452591 A    5/2012
(Continued)

OTHER PUBLICATIONS

International Search Report and Written Opinion for application PCT/US2013/066582, dated Jul. 18, 2014, 12 pages.
(Continued)

*Primary Examiner* — Anthony Salata
(74) *Attorney, Agent, or Firm* — Cantor Colburn LLP

(57) ABSTRACT

A conveyance system including a system interface having a camera to generate an image including an input fingerprint and an input finger presentation; a dispatch system including a fingerprint recognition unit and a profile unit, the fingerprint recognition unit comparing the input fingerprint to a reference fingerprint; the dispatch system accessing a user profile when the input fingerprint matches the reference fingerprint; the dispatch system comparing the input finger presentation to a reference finger presentation in the user profile; and the dispatch system retrieving a destination from the user profile when the input finger presentation matches the reference finger presentation.

12 Claims, 5 Drawing Sheets

(52) U.S. Cl.
CPC . *B66B 2201/463* (2013.01); *B66B 2201/4615* (2013.01); *B66B 2201/4638* (2013.01); *B66B 2201/4676* (2013.01)

(58) Field of Classification Search
USPC ........ 187/247, 277, 380–388, 391, 392, 393
See application file for complete search history.

(56) References Cited

U.S. PATENT DOCUMENTS

| | | | | |
|---|---|---|---|---|
| 6,707,374 | B1* | 3/2004 | Zaharia | B66B 1/468 187/392 |
| 6,772,862 | B2* | 8/2004 | Friedli | B66B 1/2458 187/247 |
| 7,190,256 | B2* | 3/2007 | Pieper | B66B 1/468 340/5.2 |
| 7,353,915 | B2* | 4/2008 | Zaharia | B66B 1/468 187/388 |
| 7,877,707 | B2* | 1/2011 | Westerman | G06F 3/04883 715/863 |
| 8,413,767 | B2 | 4/2013 | Nakashima | |
| 8,705,872 | B2* | 4/2014 | Ivanich | H04N 5/4403 345/156 |
| 9,079,749 | B2* | 7/2015 | Hsieh | B66B 3/002 |
| 10,017,355 | B2* | 7/2018 | Silvennoinen | B66B 1/468 |
| 10,023,427 | B2* | 7/2018 | Scoville | G06F 3/017 |
| 2005/0138385 | A1 | 6/2005 | Friedli et al. | |
| 2012/0152660 | A1* | 6/2012 | Fujihata | B66B 1/468 187/381 |
| 2013/0048435 | A1 | 2/2013 | Finschi | |
| 2013/0116835 | A1 | 5/2013 | Nowel | |
| 2013/0186713 | A1 | 7/2013 | Suzuki | |
| 2015/0316998 | A1 | 11/2015 | Tang | |
| 2017/0217727 | A1* | 8/2017 | Scoville | B66B 1/468 |
| 2017/0336962 | A1* | 11/2017 | Yang | G06F 3/04883 |

FOREIGN PATENT DOCUMENTS

| | | |
|---|---|---|
| CN | 103019444 A | 4/2013 |
| CN | 103365450 A | 10/2013 |
| CN | 103366159 A | 10/2013 |
| JP | 11322203 A | 11/1999 |
| JP | 2007119139 A | 5/2007 |
| JP | 4353761 B2 | 10/2009 |
| KR | 1020050005870 A | 1/2005 |
| KR | 1020060034208 A | 4/2006 |

OTHER PUBLICATIONS

Chinese First Office Action and Search Report for application CN 201380080430.2, dated Jan. 30, 2018, 14 pages.

* cited by examiner

| Day of Week | Time of Day | Current location | Reference finger presentation | destination |
|---|---|---|---|---|
| M-F | 7AM-9AM | Lobby | Index finger | Floor 21 |
| M-F | 5PM-7PM | Floor 21 | Index finger | Lobby |
| M-F | 11:30 AM-12PM | Floor 21 | Index and middle (peace sign) | Cafeteria |
| M-F | 12:30 PM-1:30PM | Cafeteria | Pinky finger | Floor 21 |
| Any | Any | Any | Thumb up | Hall Call up |

FIG. 4

ELEVATOR DISPATCH USING FINGERPRINT RECOGNITION

BACKGROUND

The subject matter disclosed herein relates to conveyance systems, such as elevator systems. More specifically, the subject matter disclosed herein relates to an elevator system that uses fingerprint recognition to control elevator dispatching.

Elevator systems can use a variety of techniques to allow a user to request elevator service. In traditional systems, users provide an up or down hall call, and then enter a floor destination upon entering the elevator car. Other existing systems allow a user to enter a destination call at a kiosk, the destination call specifying a particular floor. Other existing systems read a user identifier, such as an employee badge, to determine a destination floor.

SUMMARY

An exemplary embodiment includes a conveyance system including a system interface having a camera to generate an image including an input fingerprint and an input finger presentation; a dispatch system including a fingerprint recognition unit and a profile unit, the fingerprint recognition unit comparing the input fingerprint to a reference fingerprint; the dispatch system accessing a user profile when the input fingerprint matches the reference fingerprint; the dispatch system comparing the input finger presentation to a reference finger presentation in the user profile; and the dispatch system retrieving a destination from the user profile when the input finger presentation matches the reference finger presentation.

Another exemplary embodiment includes a method for operating a conveyance system, the method including generating an image including an input fingerprint and an input finger presentation; comparing the input fingerprint to a reference fingerprint; accessing a user profile when the input fingerprint matches the reference fingerprint; comparing the input finger presentation to a reference finger presentation in the user profile; and retrieving a destination for the user from the user profile when the input finger presentation matches the reference finger presentation.

Another exemplary embodiment includes a computer program product, tangibly embodied on a non-transitory computer readable medium, for operating a conveyance system, the computer program product including instructions that, when executed by a computer, cause the computer to perform operations including generating an image including an input fingerprint and an input finger presentation; comparing the input fingerprint to a reference fingerprint; accessing a user profile when the input fingerprint matches the reference fingerprint; comparing the input finger presentation to a reference finger presentation in the user profile; and retrieving a destination for the user from the user profile when the input finger presentation matches the reference finger presentation.

These and other advantages and features will become more apparent from the following description taken in conjunction with the drawings.

BRIEF DESCRIPTION OF THE DRAWINGS

FIG. 4 depicts a user profile in an exemplary embodiment; and

The detailed description explains embodiments of the invention, together with advantages and features, by way of example with reference to the drawings.

DETAILED DESCRIPTION

Figure 1:
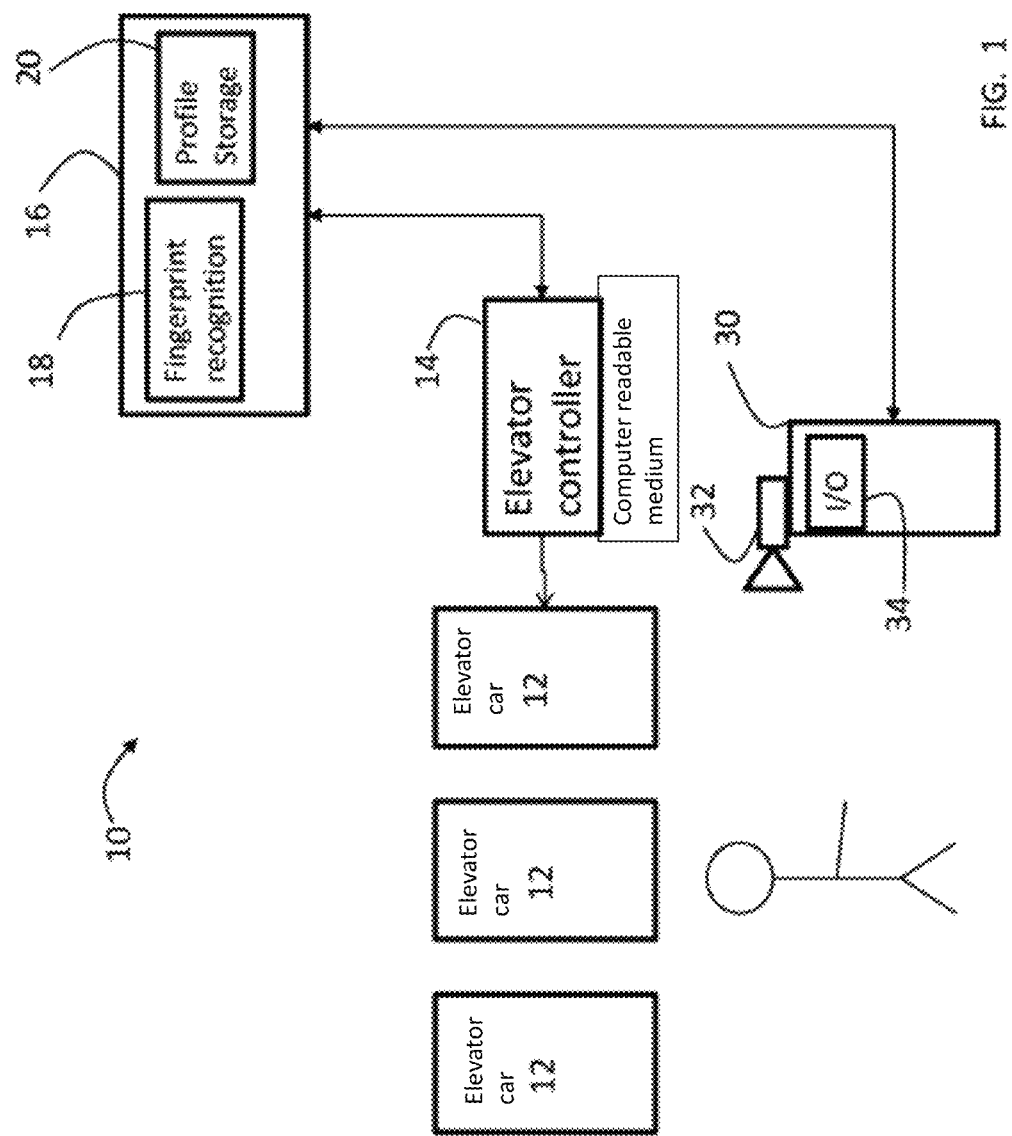
FIG. 1 depicts an elevator system in an exemplary embodiment.

FIG. 1 illustrates an elevator system 10 in an exemplary embodiment. Elevator system 10 includes a plurality of elevator cars 12. Elevator cars 12 are controlled by an elevator controller 14. Elevator controller 14 is responsible for directing elevator cars 12 to appropriate floors in a building. Elevator controller 14 may receive destination commands from a dispatch system 16, as described in further detail herein. Dispatch system 16 may be implemented using a microprocessor-based device (e.g., computer, server) executing a computer program stored in a memory to perform the functions described herein. Alternatively, the dispatch system 16 may be implemented in hardware (e.g., ASIC) or in a combination of hardware and software. The dispatch system 16 may be implemented using an existing elevator management system in an elevator system. Alternatively, the dispatch system 16 may be implemented as add-on hardware/software to an existing elevator management system or be part of a separate building management system. In other embodiments, dispatch system 16 is part of elevator controller 14. In other embodiments, the functions provided by dispatch system 16 may be implemented by one or more remotely located system(s) (e.g., remote server, cloud computing system). Dispatch system 16 may generate destination commands (e.g., hall calls and/or destination calls) that are provided to elevator controller 14. Elevator controller 14 processes the destination commands in the same manner as calls from other sources (e.g., hall buttons, destination kiosks).

As described herein, the dispatch system 16 obtains destination for a user based on fingerprint recognition and an input finger presentation. Dispatch system 16 includes a fingerprint recognition unit 18 and a profile storage unit 20. Fingerprint recognition unit 18 may be implemented by software executing on dispatch system 16. Profile storage unit 20 may be implemented by a database stored in memory on dispatch system 16. Operation of the fingerprint recognition unit 18 and the profile storage unit 20 are described in further detail herein. While the dispatch system 16 is shown including the fingerprint recognition unit 18 and the profile storage unit 20, one or both of these units, or the functions provided by these units, may be implemented by one or more system(s) (e.g., remote server, cloud computing system) remotely located from dispatch system 16.

A system interface 30 includes a system interface camera 32 for acquiring images of fingerprint(s) and an input finger presentation of users at the system interface 30. System interface 30 may be a kiosk (e.g., in the building lobby) or a wall mounted unit (e.g., at a floor landing). System interface 30 may also be implemented inside an elevator car 12. For security purposes, the number of passengers on a car may be detected (e.g., beam breaks, car weight, video analysis) and compared to the number of destination entries for that car by dispatch system 16. Movement of the elevator car 12 can be prevented if the number of passengers does not equal the number of destination entries.

System interface 30 may be implemented using a microprocessor-based device (e.g., computer, server) executing a computer program stored in a memory to perform the functions described herein. Alternatively, the system interface 30 may be implemented in hardware (e.g., ASIC) or in a combination of hardware and software. An input/output unit 34 is used to present information to users and receive commands from users. Input/output unit 34 may be implemented using a touchscreen, a display with peripherals (e.g., buttons, mouse, microphone, speaker), or other known input/output devices.

Figure 2:
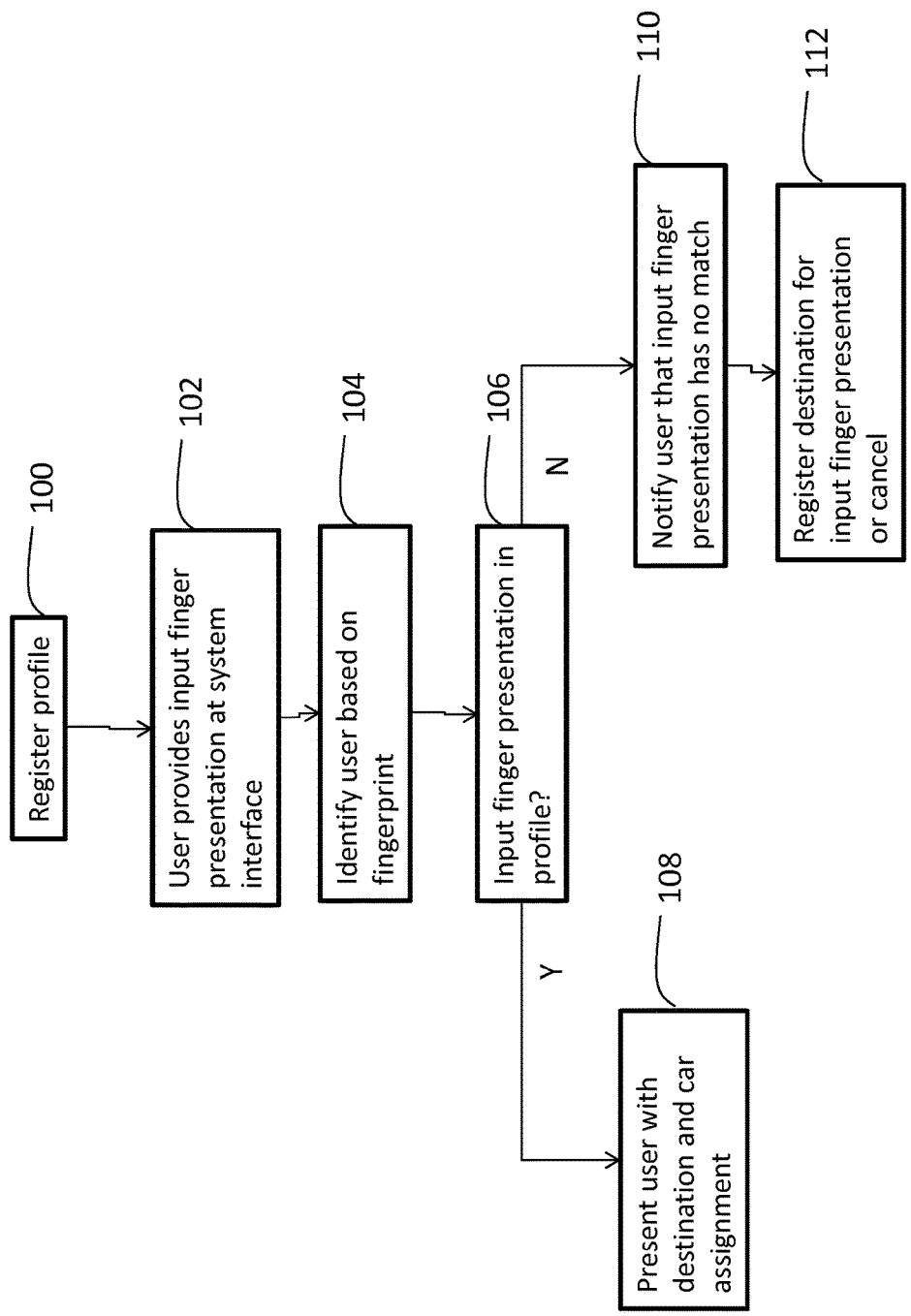
FIG. 2 depicts a process for dispatching elevator cars in an exemplary embodiment.

FIG. 2 is flowchart of a process for dispatching elevators in an exemplary embodiment. The process begins at 100 where a user registers a user profile with the dispatch system 16. Registering a user profile includes entering one or more fingerprints that will be used to identify a user. Features from the user fingerprints are extracted and stored in the user profile as reference features. Registering a user profile also includes providing one or more reference finger presentations and associating the reference finger presentation with a destination. Registering a user profile may be managed centrally by building security personnel who would create the profile.

Figure 3:
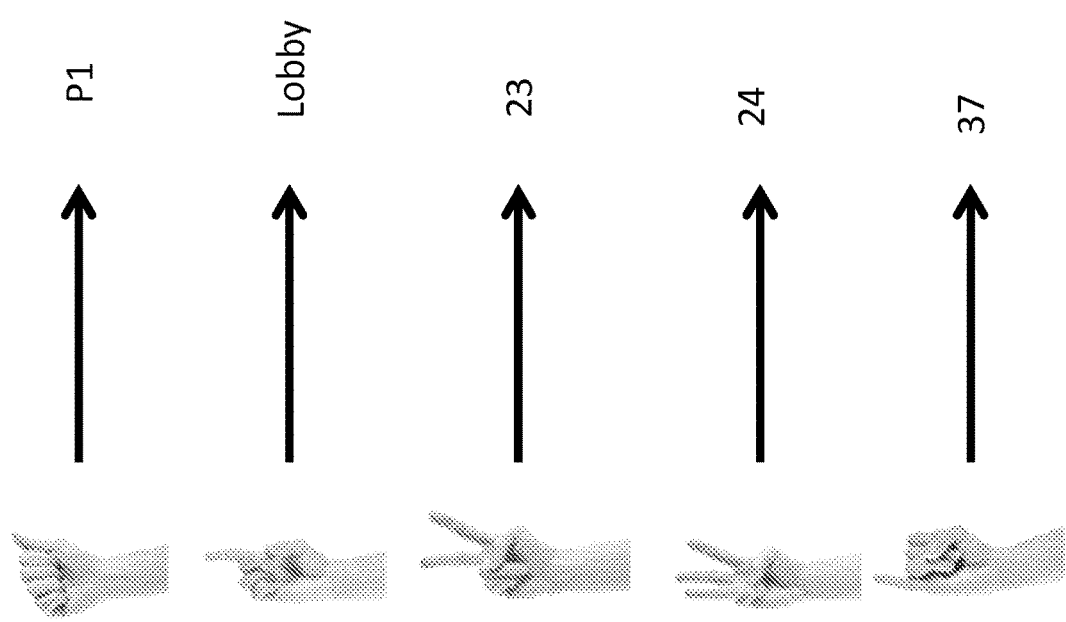
FIG. 3 depicts exemplary input finger presentations.

A finger presentation as used herein includes one or more fingers. FIG. 3 provides exemplary reference finger presentations. As shown in FIG. 3, if a user presents a thumb, this corresponds to destination P1 (parking garage level 1). If a user presents an index finger, the this corresponds to destination lobby. Other exemplary reference finger presentations are provided in FIG. 3, along with a corresponding destination.

The user may set up their user profile with as many reference finger presentations as desired. Further, the same reference finger presentation may be used to identify different destinations depending upon one or more of the current location, time of day, day of week, etc. FIG. 4 shows an exemplary user profile that includes day of week, time of day, current location, reference finger presentation and destination. Based on the day of week, time of day and current location, dispatch system 16 can determine a destination for the user. For example, as shown in FIG. 4, if the input finger presentation is an index finger, the dispatch system 16 knows to take the user from the lobby to floor 21 in the morning and from floor 21 to the lobby in the evening. Thus, a single input finger presentation (e.g., index finger) may be used for multiple destinations, based on the day of week, time of day, current location, etc. Also, the user profile allows the user to define a hall call, rather than a destination call. As shown in FIG. 4, the user may create the user profile such that a thumb up finger presentation (at any day, time or current location) corresponds to an up hall call (e.g., analogous to pressing the "up" button at a landing).

Referring back to FIG. 2, once the user defines a user profile, flow proceeds to 102 where the user later approaches system interface 30. To enter a destination, the user forms an input finger presentation and holds their hand in front of system interface camera 32 for a few seconds. The image from system interface camera 32 is provided to fingerprint recognition unit 18 to identify the user at 104. Existing techniques to recognize users based on fingerprints may be employed. For example, features of the input fingerprint are extracted and then compared to reference features in the user profiles in profile unit 20. If at 104, the user cannot be identified, the user may be directed to enter a destination call through input/output unit 34.

At 106, the user profile corresponding to the identified user is accessed and the input finger presentation provided by the user is compared to the reference finger presentation in the user profile to determine if there is a match. Various techniques may be used to determine if the input finger presentation matches the reference finger presentation. In exemplary embodiments, the fingerprint recognition unit 18 determines which fingers are presented in the input finger presentation based on the recognition of individual fingerprints and their location (e.g., the index and middle finger fingerprints are both detected and spaced apart, indicating a peace sign). In this manner, fingerprint recognition unit 18 can detect which fingers are being presented and their locations. In alternate embodiments, the image of the user's hand can be processed to detect which fingers are being presented, without expressly matching each input fingerprint in the input image to a fingerprint in the user profile. One fingerprint may be used to identify the user profile. The input finger presentation may then be derived by matching the hand shape of the input finger presentation to reference hand shape, without matching every input fingerprint in the input image to a reference fingerprint.

Figure 5:
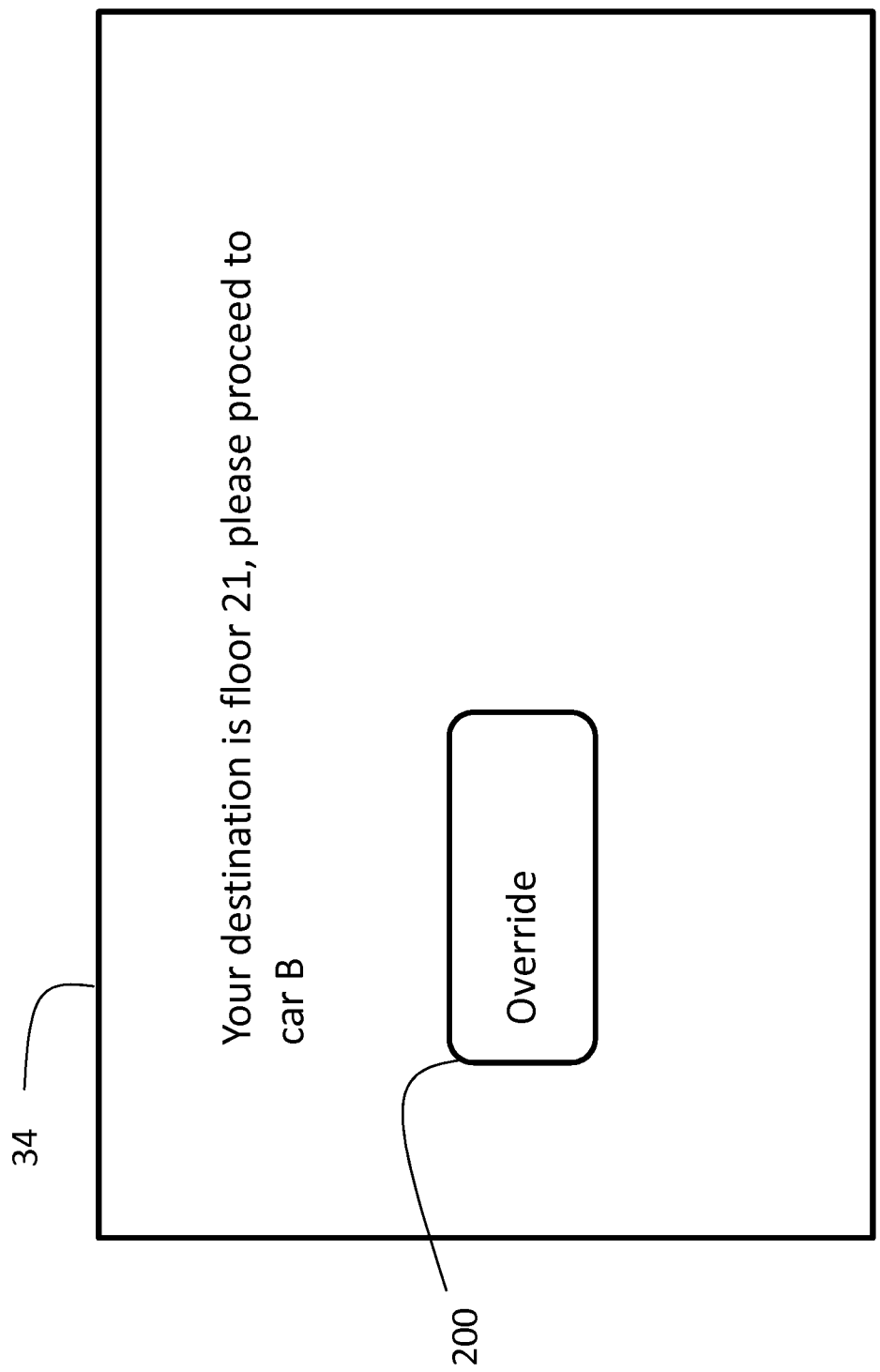
FIG. 5 depicts a system interface in an exemplary embodiment.

If the input finger presentation matches a reference finger presentation in the user profile, flow proceeds to 108. At 108, the destination corresponding to the reference finger presentation matching the input finger presentation is provided to the user at input/output unit 34. FIG. 5 depicts an exemplary message presented to the user indicating the destination. A car assignment is also provided to the user. An override icon 200 is also presented to the user, if the user does not wish to travel to the destination. If the user does not override the destination within a period of time (e.g., 3 seconds), then dispatch system 16 generates an elevator call for elevator controller 14 for the user. If the user does override the destination at 108 and enters a new destination, then an elevator call is provided to elevator controller 14 based on the new destination input by the user.

If at 106, the input finger presentation does not match a reference finger presentation, flow proceeds to 110, where the user is notified that the input finger presentation does not match a reference finger presentation in their profile. At 112, the user may be prompted to register a profile entry for the input finger presentation, cancel the input finger presentation and attempt a new input finger presentation, or enter a destination manually.

The embodiments described above relate to a lobby, but similar systems may be employed at each landing. Each landing includes a system interface 30, which may be in the form of a wall mounted device, rather than a kiosk. Processing similar to that disclosed with reference to FIG. 2 may be performed for users at each landing. In other exemplary embodiments, a second system interface may be employed to allow a user to override a previously entered destination. For example, a user may enter a destination upon entering a lobby and then realize, upon reaching the elevator landing area, that she needs to change the destination. A second system interface may be provided at the elevator landing to enter a new destination via a different input finger presentation to override a prior destination.

Embodiments described herein are directed to an elevator system dispatching elevator cars. Embodiments may also include other types of transportation (train, subway, monorail, etc.) and thus embodiments may be generally applied to conveyance systems which dispatch cars.

As described above, exemplary embodiments can be in the form of processor-implemented processes and devices for practicing those processes, such as dispatch system 16. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A conveyance system comprising:
a system interface having a camera to generate an image including an input fingerprint and an input finger presentation;
a dispatch system including a fingerprint recognition unit and a profile unit, the fingerprint recognition unit comparing the input fingerprint to a reference fingerprint;
the dispatch system accessing a user profile when the input fingerprint matches the reference fingerprint;
the dispatch system comparing the input finger presentation to a reference finger presentation in the user profile; and
the dispatch system retrieving a destination from the user profile when the input finger presentation matches the reference finger presentation;
wherein the dispatch system initiates a call to a controller in response to the destination;
wherein the input finger presentation corresponds to one or more fingers arranged in a hand shape.

2. The conveyance system of claim 1 wherein:
when the input finger presentation does not match the reference finger presentation in the user profile, the system interface prompts the user to register a destination for the input finger presentation in the user profile or cancel the input finger presentation.

3. The conveyance system of claim 1 wherein:
when the input finger presentation matches the reference finger presentation in the user profile, the system interface prompts the user to override the destination.

4. The conveyance system of claim 3 wherein:
when the user overrides the destination, the system interface requests a new destination from the user.

5. The conveyance system of claim 1 wherein:
the user profile associates a reference finger presentation with more than one destination.

6. The conveyance system of claim 5 wherein:
the reference finger presentation is associated with a first destination in response to a first current location of the user;
the reference finger presentation is associated with a second destination in response to a second current location of the user.

7. The conveyance system of claim 1 wherein:
the conveyance system is an elevator system and the destination is a floor.

8. The conveyance system of claim 1 wherein:
comparing the input finger presentation to the reference finger presentation in the user profile includes comparing each fingerprint in the input finger presentation to each fingerprint in the reference finger presentation.

9. The conveyance system of claim 1 wherein:
comparing the input finger presentation to the reference finger presentation in the user profile includes comparing a hand shape of the input finger presentation to reference hand shape.

10. The conveyance system of claim 1 further comprising:
a car to convey passengers;
the dispatch system preventing travel of the car if a number of passengers in the car does not equal a number of destination entries for the car.

11. A method for operating a conveyance system, the method comprising:
generating an image including an input fingerprint and an input finger presentation;
comparing the input fingerprint to a reference fingerprint;
accessing a user profile when the input fingerprint matches the reference fingerprint;
comparing the input finger presentation to a reference finger presentation in the user profile;
retrieving a destination for the user from the user profile when the input finger presentation matches the reference finger presentation;
initiating a call to a controller in response to the destination;
wherein the input finger presentation corresponds to one or more fingers arranged in a hand shape.

12. A computer program product, tangibly embodied on a non-transitory computer readable medium, for operating a conveyance system, the computer program product including instructions that, when executed by a computer, cause the computer to perform operations comprising:
generating an image including an input fingerprint and an input finger presentation;
comparing the input fingerprint to a reference fingerprint;
accessing a user profile when the input fingerprint matches the reference fingerprint;
comparing the input finger presentation to a reference finger presentation in the user profile;
retrieving a destination for the user from the user profile when the input finger presentation matches the reference finger presentation;
initiating a call to a controller in response to the destination;
wherein the input finger presentation corresponds to one or more fingers arranged in a hand shape.

* * * * *